US007843491B2

(12) United States Patent
Vallone et al.

(10) Patent No.: US 7,843,491 B2
(45) Date of Patent: Nov. 30, 2010

(54) MONITORING AND PRESENTING VIDEO SURVEILLANCE DATA

(75) Inventors: Robert P. Vallone, Palo Alto, CA (US); Stephen G. Russell, San Francisco, CA (US); Gordon T. Haupt, San Francisco, CA (US); Shannon P. Hale, San Francisco, CA (US); Michael E. Wells, San Francisco, CA (US)

(73) Assignee: 3VR Security, Inc., San Francisco, CA (US)

( * ) Notice: Subject to any disclaimer, the term of this patent is extended or adjusted under 35 U.S.C. 154(b) by 1268 days.

(21) Appl. No.: 11/398,160

(22) Filed: Apr. 4, 2006

(65) Prior Publication Data

US 2006/0221184 A1 Oct. 5, 2006

Related U.S. Application Data

(60) Provisional application No. 60/668,645, filed on Apr. 5, 2005.

(51) Int. Cl.
*H04N 7/18* (2006.01)

(52) U.S. Cl. ....................................................... 348/143

(58) Field of Classification Search ....................... None
See application file for complete search history.

(56) References Cited

U.S. PATENT DOCUMENTS

2005/0132414 A1 * 6/2005 Bentley et al. .............. 725/105
2006/0078047 A1 * 4/2006 Shu et al. ............... 375/240.01

OTHER PUBLICATIONS

"Notification of Transmittal of the International Preliminary Report on Patentability" in International application No. PCT/US2005/008655.
Current claims of PCT/US2005/008655.
"Notification of Transmittal of the International Preliminary Report on Patentability" in International application No. PCT/US2005/008735.
Current claims of PCT/US2005/008735.

* cited by examiner

*Primary Examiner*—Justin P Misleh
(74) *Attorney, Agent, or Firm*—Hickman Palermo Truong & Becker LLP

(57) ABSTRACT

A method of displaying video surveillance system information is disclosed. Video clips associated with events are represented by event cards. The event cards include frames selected from the video clips associated with the events. Event cards include metadata, and can be annotated. Display of overlapping event cards causes a compressed event card to be displayed. Selection of a compressed event card dynamically expands the compressed event card to display a paneled event card.

66 Claims, 13 Drawing Sheets

MONITORING AND PRESENTING VIDEO SURVEILLANCE DATA

CLAIM OF PRIORITY; RELATED APPLICATIONS

This application claims domestic priority under 35 U.S.C. 119(e) to U.S. Provisional Patent Application No. 60/668,645, filed Apr. 5, 2005, entitled METHOD AND APPARATUS FOR MONITORING AND PRESENTING DATA IN A VIDEO SURVEILLANCE SYSTEM, the contents of which are hereby incorporated by reference in their entirety for all purposes. This application is related to (1) U.S. patent application Ser. No. 11/082,026, filed Mar. 15, 2005, entitled INTELLIGENT EVENT DETERMINATION AND NOTIFICATION IN A SURVEILLANCE SYSTEM and (2) U.S. patent application Ser. No. 11/081,753, filed Mar. 15, 2005, entitled INTERACTIVE SYSTEM FOR RECOGNITION ANALYSIS OF MULTIPLE STREAMS OF VIDEO, which issued on May 5, 2009 as U.S. Pat. No. 7,529,411, the contents of each of which are hereby incorporated in their entirety for all purposes.

FIELD OF THE INVENTION

The present invention relates to video surveillance systems, and more specifically, to a system that presents video data in a format that allows a user to quickly scan or survey video data captured by a multi-camera surveillance system.

BACKGROUND

Most video surveillance monitoring systems present video data captured by a surveillance camera on one or more monitors as a live video stream. In a multi-camera system, video streams may be presented in multiple video panels within a single large screen monitor using multiplexing technology. Alternatively or in addition, multiple monitors may be used to present the video streams.

When a large number of cameras are used in a surveillance system, the number of screens and/or the number of video panels displayed in each screen becomes unwieldy. For instance, a 12-camera system may be set up to display output from each camera in a separate designated panel on a large-screen monitor. A user monitoring video surveillance data will have to somehow continuously scan the 12 panels on the screen, each presenting a different video stream, in order to monitor all surveillance data. This constant monitoring of large amounts of continuous data is very difficult for users.

Significantly, newer video surveillance systems may incorporate hundreds, or even thousands, of cameras. It is impossible for a user to monitor all of the video data streams at once.

In addition, more often than not there is no active incident or activity to monitor in typical surveillance systems. For example, a camera positioned to monitor a side exit door may only have activity occurring, e.g., people entering and exiting the door, for about 10% of the day on average. The rest of the time, the video stream from this camera comprises an unchanging image of the door. It is very difficult for a user to effectively monitor a video stream that is static 90% of the time without losing concentration, much less hundreds of such video streams.

It is possible in some systems to review video surveillance data by re-playing the stored video data stream at a high speed, thereby reducing the amount of time spent looking at the video stream. However, even if a stored stream of video data that is 8 hours long is played back at 4× speed, it will still take 2 hours to review. Additionally, such review techniques cannot be performed in real-time. A user is always reviewing video data at a time well after it was captured. In a multi-camera surveillance system, the lag and the amount of time required to review captured video data may make it impossible to review all surveillance data within a time period in which the data is still useful.

A system that allows users to efficiently and effectively monitor multiple video streams in a surveillance system as the data is captured is needed.

SUMMARY OF EMBODIMENTS OF THE INVENTION

Techniques are provided for displaying representations of the video data captured by a video surveillance system. The representations of video data are easily monitored by users, and link to the actual video stream data being represented.

In one embodiment, a method is provided for displaying video surveillance system information. The method includes capturing a video stream from a camera, and detecting an event. An event video clip associated with the event is selected from the captured video stream. A representation of the event video clip is generated using data from the clip. The representation is displayed, wherein selection of the representation causes playback of the event video clip.

In one embodiment, a method is provided for displaying event card representations of events in a multi-camera video surveillance system. The method includes detecting a first event, and generating a first set of event cards for the first event. The set of event cards includes a multi-panel event card, and a single-panel event card. The method further includes detecting a second event after the first event, and generating a second set of event cards for the second event. The method further includes representing the first event in a timeline with the multi-panel event card of the first set of event cards. The second event is represented in the timeline with the multi-panel event card of the second set of event cards. If the multi-panel event card of the second set overlaps the multi-panel event card of the first set, then the representation of the first event in the timeline is dynamically changed to the single-panel event card of the first set of event cards.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1:
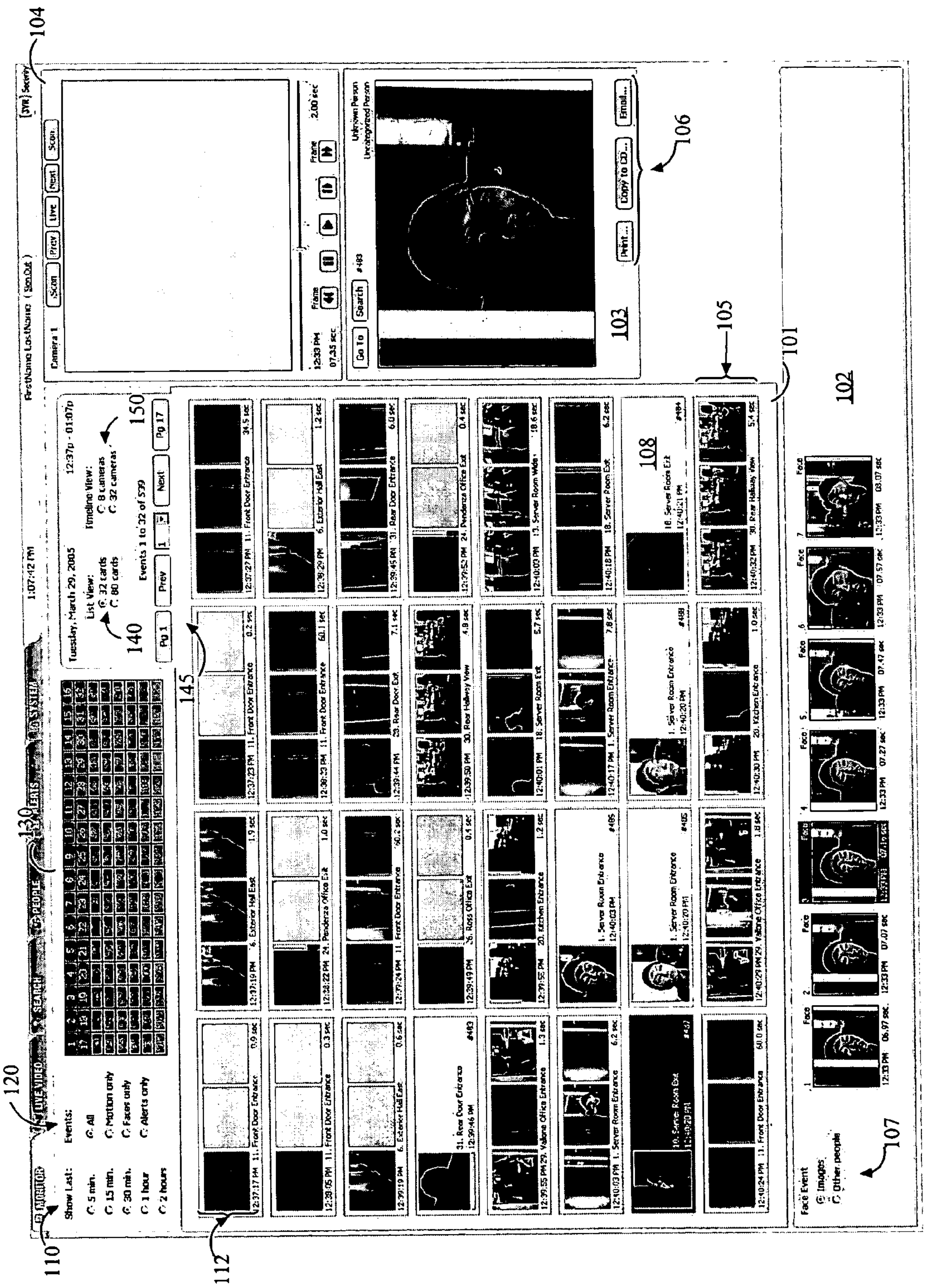
FIG. 1 is an example screen from an embodiment that illustrates three-panel event card representations of video stream data captured by a multi-camera video surveillance system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Representations of activity or events that occur in video streams are shown using techniques disclosed herein. Instead of monitoring large amounts of live video data, users can skim over or scan the representations of events in the video streams for events of interest. Because video streams of unchanging images are not displayed, a user can more effectively monitor a much larger number of video cameras simultaneously. Other features of a user interface that includes representations of video stream data are also disclosed herein.

Event Cards

In one embodiment, techniques disclosed herein allow segments of the video streams captured by a multi-camera surveillance system to be represented by and displayed as "event cards." An "event card", as used herein, is a visual indicator that represents the video stream segment or clip corresponding to the occurrence of an "event." The video stream clip represented by an event card is termed an "event video clip" herein.

By using event cards to represent a segment of a video stream that corresponds to a period of activity, a user is not required to constantly scrutinize multiple video streams. Instead, a user can quickly scan event cards to determine which events are of interest, and then select that event card to see the corresponding event video clip and other relevant associated data. In one embodiment, the event video clip is only displayed if a user selects the event card that represents the event video clip.

Various techniques can be used to detect an "event" that causes an event card to be generated and displayed. An event may be detected in the video stream data itself. For example, a motion detecting application can be used to detect a "motion event." The segment of video associated with a motion event is identified and represented by an event card. Alternatively, an event card may represent a segment of video corresponding to an externally detected event. For example, a card reader system networked with the video surveillance system may generate a "card entry event" when a person uses his magnetically encoded card to enter a secure area. In this case, the event video clip is a segment of video data associated with the card entry event, and an event card can be generated from the event video clip. The event video data associated with a card entry event may comprise a video clip taken by a particular camera located near the card reader during the time of the event detected by the card reader. In the case of a card entry event, or other event detected by external means, it is possible that there will be no activity in the event video clip, even though an "event" has been detected.

The length of the event video clip may be the period of time in which contiguous motion was detected, some other variably determined length, or a predetermined fixed length of time. For example, after a motion event is detected, if there has not been motion for a predetermined period of time, this can be used to define the event stop point. As another example, a fixed length of 10 seconds may be associated with card entry events.

Various types of events, and methods of detecting events, are disclosed in the Event Determination patent application (U.S. patent application Ser. No. 11/082,026, filed Mar. 15, 2005, entitled INTELLIGENT EVENT DETERMINATION AND NOTIFICATION IN A SURVEILLANCE SYSTEM), previously incorporated by reference. However, any method of detecting activity or an event in a video stream, or across video streams, can be used, and the techniques disclosed in the Event Determination patent application are not required.

An event card represents the portion of video stream data that corresponds to a particular event. Users can quickly view event cards to determine whether an event is interesting enough to obtain more data about the event or view the event video clip that an event card represents. When event cards are used to represent the video data captured by the video surveillance system, the surveillance system does not need to display all video surveillance data. The event cards represent all video data captured by the surveillance system that may be of interest to a user.

Event cards can be quickly scanned. This enables a user to easily find a particular event video clip. For example, if a user knows the time that an event occurred, but not which particular camera might have caught the event, then the user can organize the event cards by time, and skim event cards from the known time period. As another example, if a user knows which camera or camera cluster captured an event, but not the time, the user can organize or filter event cards by camera, and scan event cards generated by that camera or camera cluster. Instead of reviewing all data from all cameras, the user simply scans relevant event cards for an event of interest. Without event cards, a user would have to locate video surveillance tapes or stored recordings that may have captured the event, and manually review all of the stored video data in order to find the video data associated with the event. Scanning event cards takes only a fraction of the time needed to review stored video data, even if the playback is fast-forwarded. In addition, in some embodiments, event cards are generated and shown as the events occur, so there is no delay in locating stored video data to playback.

A short series of frames is easy for the human eye to scan. In one embodiment, an event card consists of a series of panels that contain frames or images extracted from the event video clip that the event card represents. In one embodiment, an event card is comprised of a single panel that represents the entire event video clip. In another embodiment, an event card is comprised of three panels that represent the entire event video clip. Although three-panel event cards and one-panel event cards are described herein, any number of panels could be used in an event card. In addition, an event card is only one means of representing event video stream data in a format that is easy for a user to scan, and other means of representing video stream data can be used.

In a preferred embodiment, a system uses multiple types of event cards to represent video data.

In one embodiment, a three-panel event card is comprised of a series of panels that contain thumbnail-sized images of frames selected from the corresponding event video clip. The first panel of a three-panel event card contains an "event start image." The event start image is typically a frame extracted from the corresponding event video clip. Preferably, the frame selected as the event start image illustrates typical activity in a beginning portion of the event video clip. The second panel of a three-panel event card contains an "event middle image", which is also a frame extracted from the corresponding event video clip. Preferably, the frame selected as the event middle image illustrates typical or representative activity from a middle portion of the event video clip. The third panel of a three-panel event card contains an "event end image" that is a frame that illustrates typical activity towards the end of the event video clip.

The event start, middle and end images do not have to correspond to the very first, exact middle and very last frames in an event video clip. For example, in an event card that represents a 10-second event or period of activity, any frame within the first second (or the first one to three seconds) of the event video clip could be selected as the event start image, any frame within the range of 4 to 6 seconds of the video clip could be selected as the event middle image, and any frame from within the last second (or the last three seconds) of the video clip could be selected as the event end image. Any configuration can be used to determine the time periods that define the subset of frames from which one or more frames can be selected.

Any algorithm for selecting a frame within a subset of frames could be used to select an appropriate frame for inclusion in an event card. In one embodiment, the frames are selected according to an algorithm that automatically determines which frames are most interesting for the type of event being detected. For instance, if an event is triggered by the detection of a face in a video stream, the event start image may be selected by an algorithm that searches for the frame in a set of frames that is most likely to include a person's face.

In addition to selecting frames, a best view of the image in a selected frame may be determined and used in an event card. For example, an algorithm may select an area within the frame, and a magnification for the image that provides the "best" view. As a specific example, for a face event, a frame that illustrates a best view of the face may be determined, and then cropped and zoomed to show a best view of the face within that frame. The ability to select a best frame, and determine a best view in a selected frame, is useful when one-panel face event cards are used to represent face event video clips, for example.

In one embodiment, the frames and views that are selected to represent an event video clip in an event card are stored at a higher resolution and/or higher quality than the video clip itself. In addition, additional frames may be selected that are not included in the event card itself, but are stored separately with the event card. Display of additional frames associated with an event card is described in more detail below.

In one embodiment, event cards are generated using the selected frames, and stored separately, with each stored event card containing the frames used in the card. For example, for any given event, a one-panel card with one selected frame may be stored, and a three-panel card with three selected frames may be separately stored. Each stored event card is associated with the event. In another embodiment, frames to be used in event cards are selected and stored, and the event cards for that event are generated on the fly using the stored frames. Other methods of generating and storing event cards will be apparent to those skilled in the art.

FIG. 1 illustrates an example embodiment of a surveillance system monitor panel that uses event cards. In the embodiment shown in FIG. 1, 32 three-panel event cards are shown in event card area 101. Each three-panel event card contains panels for an event start image, an event middle image and an event end image, as shown by representative event card 105. Some event cards, e.g. event cards representing shorter events, may contain only one or two panels instead of three panels. Each event card in this embodiment includes basic information about the event video clip it represents, such as which camera the event occurred in, the time of the event, and the length of the event video clip associated with the event. For example, the representative event card 105 was taken at time 12:40:32 p.m. from camera 30 (i.e., the Rear Hallway View camera), and the associated event video clip is 5.4 seconds long.

In the embodiment of FIG. 1, a "32 card" view is chosen, as shown by list view selection panel 140. As shown, in this view 32 event cards are shown (4 columns of 8 events cards each) in each page in temporal order. The oldest event card (112) on this page represents an event that occurred at 12:37:17, and the most recent event card (105) represents and event that occurred at 12:40:32. As new events occur and are detected by the system, the page will be dynamically updated such that the newer event cards are shown at the end of event card area 101. Older event cards will be pushed to earlier pages. Event page buttons 145 can be used to page through the event cards in order to see older or more recent event cards. The pages are continuously updated as events occur and new event cards are generated.

Figure 2:
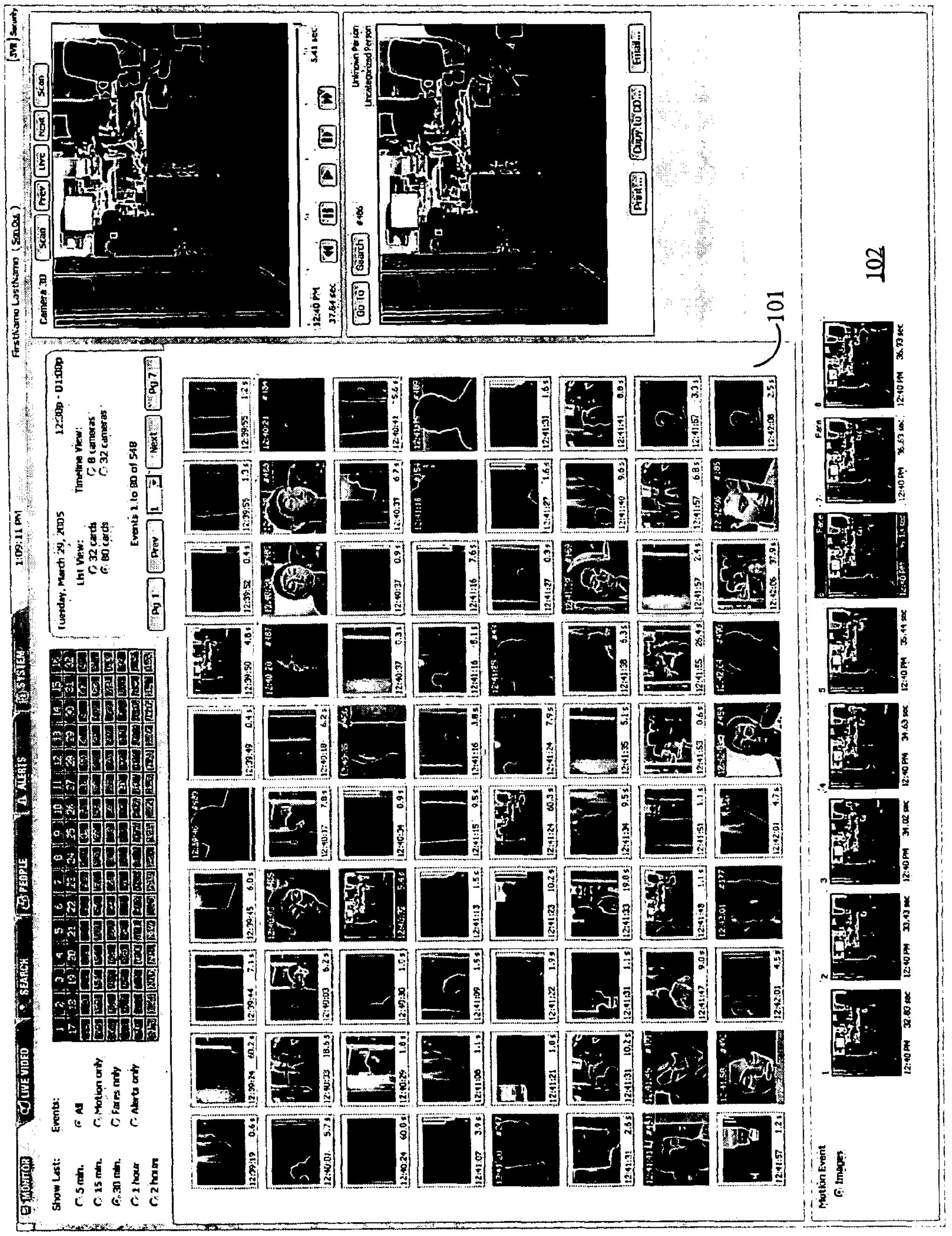
FIG. 2 is an example screen from an embodiment that illustrates one-panel event card representations of video stream data captured by a multi-camera video surveillance system.

List view selection panel 140 also allows for a view in which 80 cards are shown simultaneously on a screen. FIG. 2 illustrates an embodiment in which 80 cards are shown. As shown in FIG. 2, because so many event cards are shown simultaneously, one-panel event cards are used to represent event video clips in event card area 101 instead of three-panel event cards. Other types of views can be used that show more or fewer event cards, or other types of representations.

In the embodiment shown in FIG. 1, a user has selected to view event cards for the last 30 minutes, as shown by time period selection panel 110. In this example, 539 events have been detected in the last 30 minutes, as shown by event page buttons 145. If the user had selected a 5 or 15 minute view instead, fewer pages would be available on the event page buttons 145. As time goes on, the oldest event cards are dropped from the event card pages as they become older than the selected time period. Although the embodiment shown in FIG. 1 only shows time period choices from 5 minutes to 2 hours, a system can be configured to allow shorter and/or longer time period choices. The number of pages dynamically changes as events are detected and/or events are dropped from the selected time period.

In the embodiment shown in FIG. 1, a user has selected to view event cards from 32 cameras in a multi-camera system, as shown by camera selection box 130. A user can select a single camera in camera selection box 130 to filter the monitor panel such that only event cards that represent events that occurred in that camera's video stream are displayed. If only a single camera had been selected instead, only event cards generated by video data captured by that camera would appear in event card area 101. Any number of cameras can be selected. In addition, in one embodiment, cameras may be selected by group, which will be discussed further herein.

By using selection panels 110, 120, 130, 140, and 150, the user can dynamically choose and filter the surveillance data that will be monitored. In addition, the monitor panel can be configured differently for different users. For example, a manager may be given a choice of displaying event cards for the past 2 weeks while a security guard may only be allowed a maximum time period choice of an hour. Various alternatives will be apparent to those skilled in the art.

Types of Events and Face Event Cards

In an embodiment in which multiple types of events can be detected, and events can be categorized, a user can select which type of events to view, as shown by event type selection panel 120. In the embodiment shown in FIG. 1, a user has selected to view "all events." However, if the user had selected to view only face events, then only event cards in which a person's face has been detected will be shown. If the user had selected to view only motion events, only event cards that displayed detected motion would be shown. In one embodiment, face events are a subset of motion events that includes only those motion events in which a face has been detected. Other types of events and options for the event type selection panel 120 are of course possible.

FIG. 1 illustrates an embodiment in which face events are represented differently than motion events. In this embodiment, motion events are represented by three-panel event cards, while face events are represented by one-panel face event cards that display the image that contains the "best" view of the person's face in the associated video clip, as determined by the system. As shown in FIG. 1, event card 105 represents a motion event, and face event card 108 represents a face event. In one embodiment, the image in the face event card is cropped and magnified such that a best view of the face in a frame of the event video clip is shown.

The face event card may include additional information not included in other types of event cards. For example, the system may automatically identify the person from the image of the face, and this identification can be displayed on the face event card. If a person could not be automatically identified by the system, this may also be indicated on the face event card. Other information associated with the identified person, such as organizational information, group associations and the like, as discussed in the Object Recognition patent application (U.S. patent application Ser. No. 11/081,753, filed Mar. 15, 2005, entitled INTERACTIVE SYSTEM FOR RECOGNITION ANALYSIS OF MULTIPLE STREAMS OF VIDEO) may also be shown in a face event card.

Figure 3:
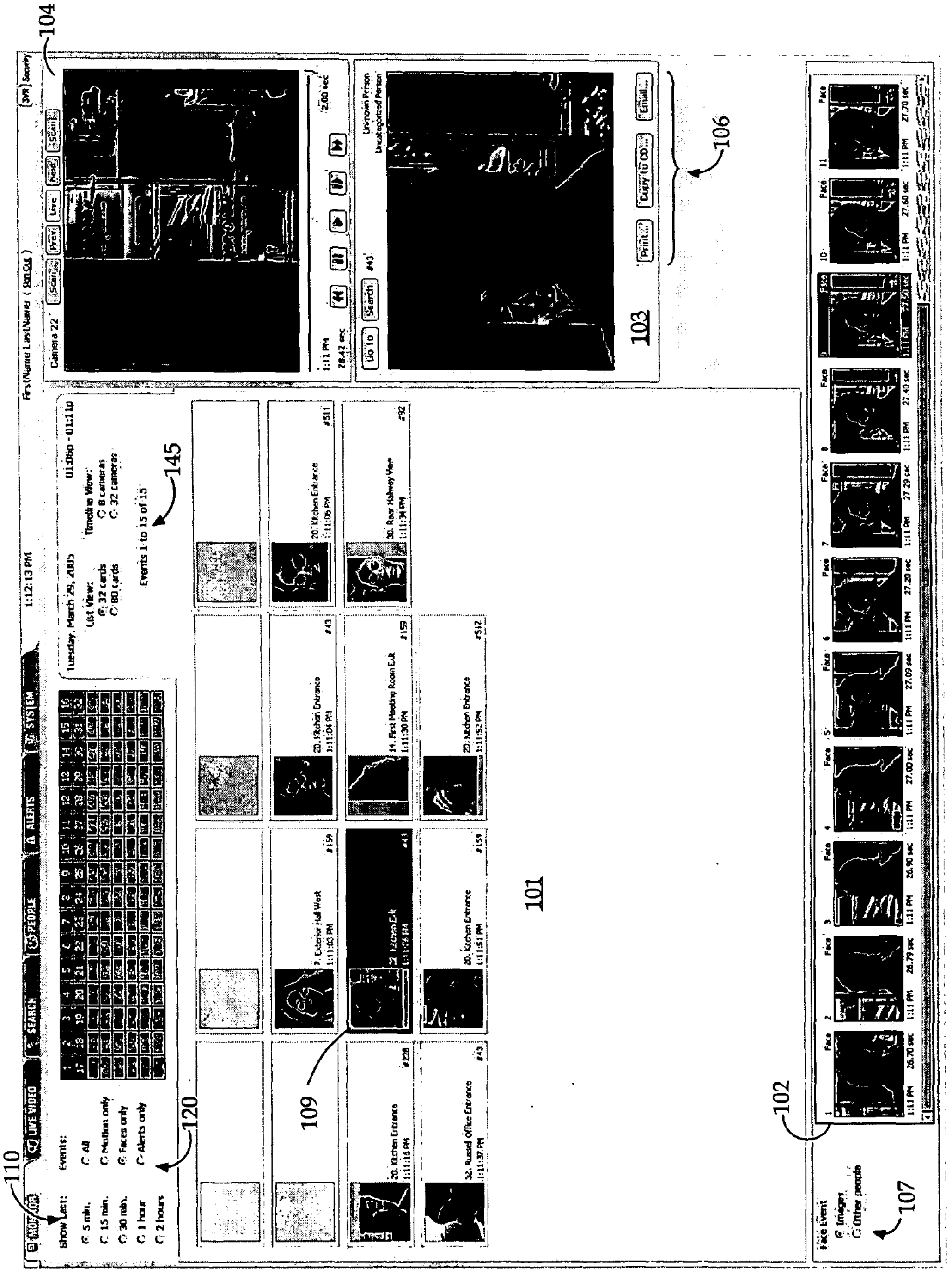
FIG. 3 is an example screen from an embodiment that illustrates one-panel face event card representations of video stream data captured by a multi-camera video surveillance system.

FIG. 3 illustrates an embodiment in which "Faces Only" is selected in event type selection panel 120. As shown, only face events represented by face event cards are shown in event card area 101. In addition, in the embodiment shown in FIG. 3, a 5-minute period has been selected in time period selection panel 110. In this example, there have only been 15 detected face events in the past 5 minutes, so those 15 face event cards are shown, and panel 145 no longer provides options to page through the event cards, as there is only a single page of event cards to display.

Selection of an Event Card

In all of these example embodiments, when a user selects an event card displayed in the event card area on the monitor panel, more information about the event associated with the selected event card is displayed. For example, in FIG. 3, face event card 109 has been selected. Upon selection, the event video clip that is represented by this event card is automatically played in video clip playback panel 104. As shown, the video clip playback panel preferably includes standard video playback controls, such as rewind, fast-forward, pause, etc. These controls can be used to re-play, pause or otherwise control playback of the event video clip.

In addition, the video clip playback panel may include additional controls that allow the user to skip to the next event detected in the video stream generated by the same camera by clicking "Next." Likewise, clicking "Prev" will automatically display the previous event for that camera. "Scan" scans forwards or backwards through events. These buttons provide "seek and scan" features much like a car radio that allow events captured by a single camera to be quickly displayed in order without requiring the user to select each event card individually. The "seek and scan" features may be useful for reviewing all persons entering a particular door, for example, because events are shown without the static "dead time" between events in the actual video data.

Clicking on the "Live" button in the video clip playback panel 104 will present the video stream as it is being captured by the currently selected camera. More or fewer controls could be used to control the video clip display panel.

In addition to playing the event video clip in panel 104, the monitor panel may present a series of selected frames from the corresponding event video clip when an event card is selected, as shown by frame panel 102. Instead of only viewing the three frames in the three-panel event card, the user is now able to automatically view several frames extracted from the associated event video clip. Any number of still frames can be displayed in frame panel 102. The number of frames to display in the frame panel can be set to a fixed number. Alternatively, the number of frames displayed in the frame panel can vary. For example, the number can vary according to the length of the corresponding event video clip, or the number of frames that correspond to a particular view.

FIG. 3 illustrates more than 11 frames associated with event card 109, as shown by the scroll bar. FIG. 1 illustrates 7 still frames and FIG. 2 illustrates 8 still frames. Any algorithm for selecting which frames to store with the event card and display in the frame panel can be used. Like the frames selected for the event card, the stored frames presented in the frame panel can be stored in a higher resolution format, can be selected by an algorithm that determines "best" frames for the type of event, and can optionally be cropped and zoomed. The number of frames to extract and store for an event video clip can be configurable.

When a particular frame is selected in the frame panel 102, a larger and perhaps higher-resolution display of the selected frame may be shown in a separate panel, as shown by single frame panel 103. As shown in FIG. 1, the third panel in the panel frame has been selected, and is shown in single frame panel 103. In one embodiment, the single frame panel is initialized to the first frame shown in the frame panel 102; alternatively, the system can select a "best" frame to display in the single frame panel 103. For example, the system can select a "default" frame that is determined to illustrate a best view of a face to show in single frame panel 103.

In one embodiment, single frame panel 103 includes controls for printing, e-mailing, editing, storing, archiving or otherwise using the currently selected frame, as shown by controls 106. In addition, the single frame panel 103 may present additional information about the selected frame or event, such as an identification of the person. The identification may be performed by any method, such as methods disclosed in the Object Recognition patent application. In addition, in one embodiment a user may be allowed to enter an identification into the system for the person shown in the frame, or change attributes of identified persons.

Single frame panel 103 is useful in capturing and storing a high-resolution "best view" of an image captured in surveillance video data that can be used outside the surveillance system. For example, a view printed out from single frame panel 103 may be given to law enforcement authorities.

In addition, when a face event card is selected, the frame panel may include an option to select and present only frames associated with the face found in the corresponding event video clip, or to select frames that may also include other people or items, as shown by selection panel 107 in FIGS. 1 and 3. The event video clip corresponding to a face event may be a video clip of any length of time in which an image of a face has been detected.

Alerts

Event type selection panel 120 also includes an "Alerts Only" choice. Although not shown in FIG. 1, an embodiment in which "Alerts Only" has been chosen would only display those events that meet some predefined alert criteria. For example, alerts could be configured such that only motion occurring on camera #3 between the hours of 6 p.m. and 8 a.m. will cause an "alert." In this case, the event card area 101 would only show event cards that occurred on camera #3 if "Alerts Only" were selected in event selection panel 120.

If the user has selected to display all event cards in event type selection panel 120, the event cards that correspond to a configured alert may be highlighted or otherwise marked. For example, all event cards that meet alert criteria may be displayed with a red border. In one embodiment, different types of alerts may cause the event cards to be highlighted in different colors, such that a user can quickly determine which event cards are related to particular types of alerts. Event cards may also be labeled with the name of the associated alert.

In one embodiment, an Alerts Configuration module may be included. For example, the Monitor Panel of FIGS. 1-3 illustrates an "Alerts" tab. When the Alerts tab is selected, a list of previously defined alerts and actions may be displayed, along with an interface for creating or editing alerts. As disclosed in the Event Determination patent application, alerts can be configured for different time periods, cameras, types of events, identified or unidentified items, etc.

Although not shown in FIGS. 1-3, in certain embodiments the event type selection panel may include the ability to select only particular types of alerts, or the ability to query for particular types of alerts. For example, an alert type option in the event type selection panel may include the ability to filter events such that only event cards associated with unidentified face events are displayed. In addition, if unidentified faces are displayed, the user may also be given the option of identifying persons in the unidentified face events, as well as adding or changing information associated with identified persons.

Timeline View

The embodiments shown in FIGS. 1-3 illustrate a "List" view of event cards. As illustrated by FIGS. 1-3, a list view illustrates all event cards for the selected time period, selected cameras, and selected event type. Significantly, if all the event cards cannot fit into one screen, pages are created that a user can page through to find the desired event cards.

Alternatively, the event cards may be shown in a "Timeline" view when "Timeline" view is selected in selection panel 150. In a timeline view, all representations of event video clips, e.g. event cards, are shown on a single page on timelines. While the list view layout is ordered by time, across cameras; in the timeline view, the user can scan cameras across time for events. All information may be shown on a single screen, without creating pages. Alternatively, the timeline may expand to multiple pages with page turning buttons similar to what is described above with respect to the list view (e.g. see event page buttons 145 of FIG. 1).

Figure 4:
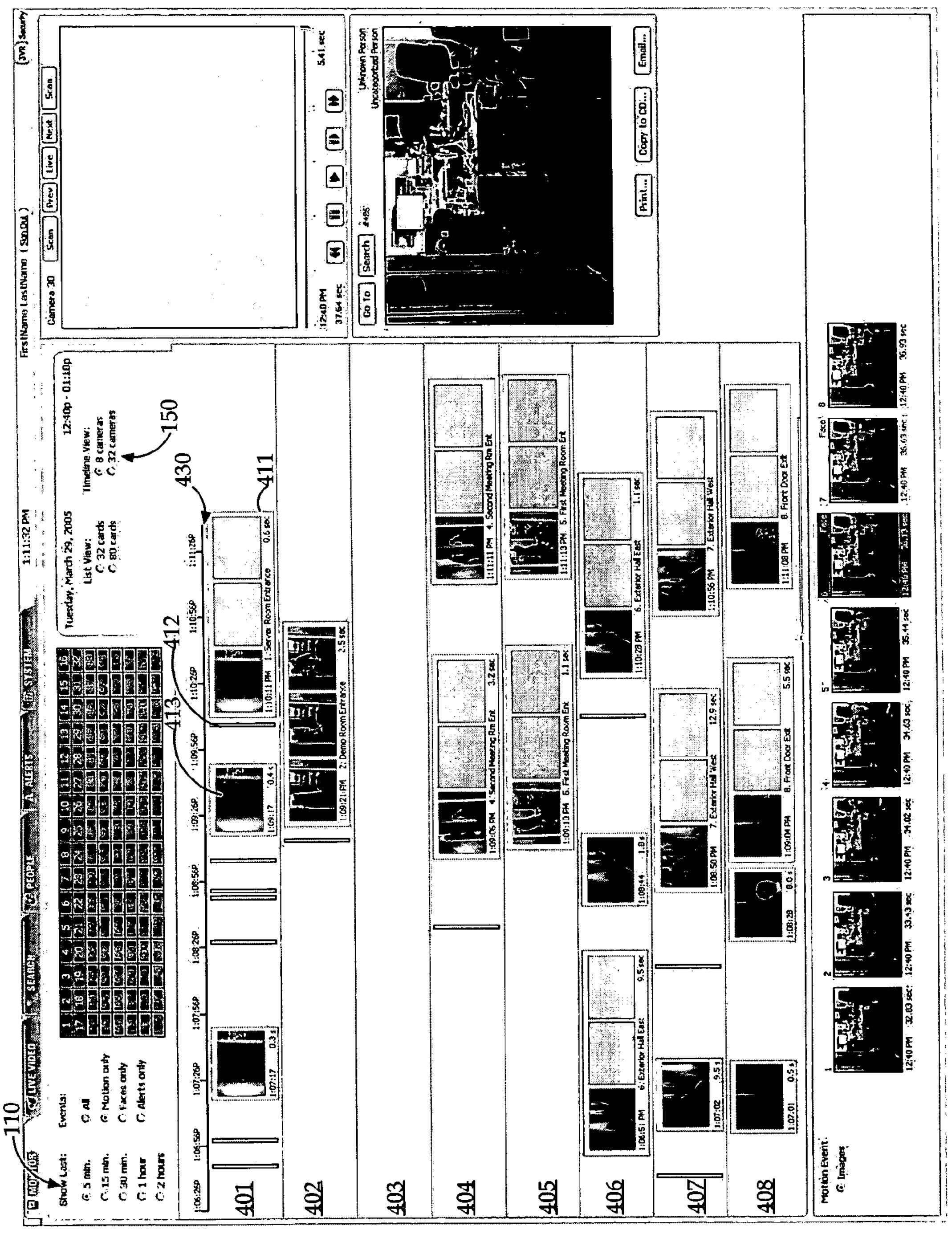
FIG. 4 is an example screen from an embodiment that illustrates dynamic event card representations of video stream data captured by a multi-camera video surveillance system.
Figure 5:
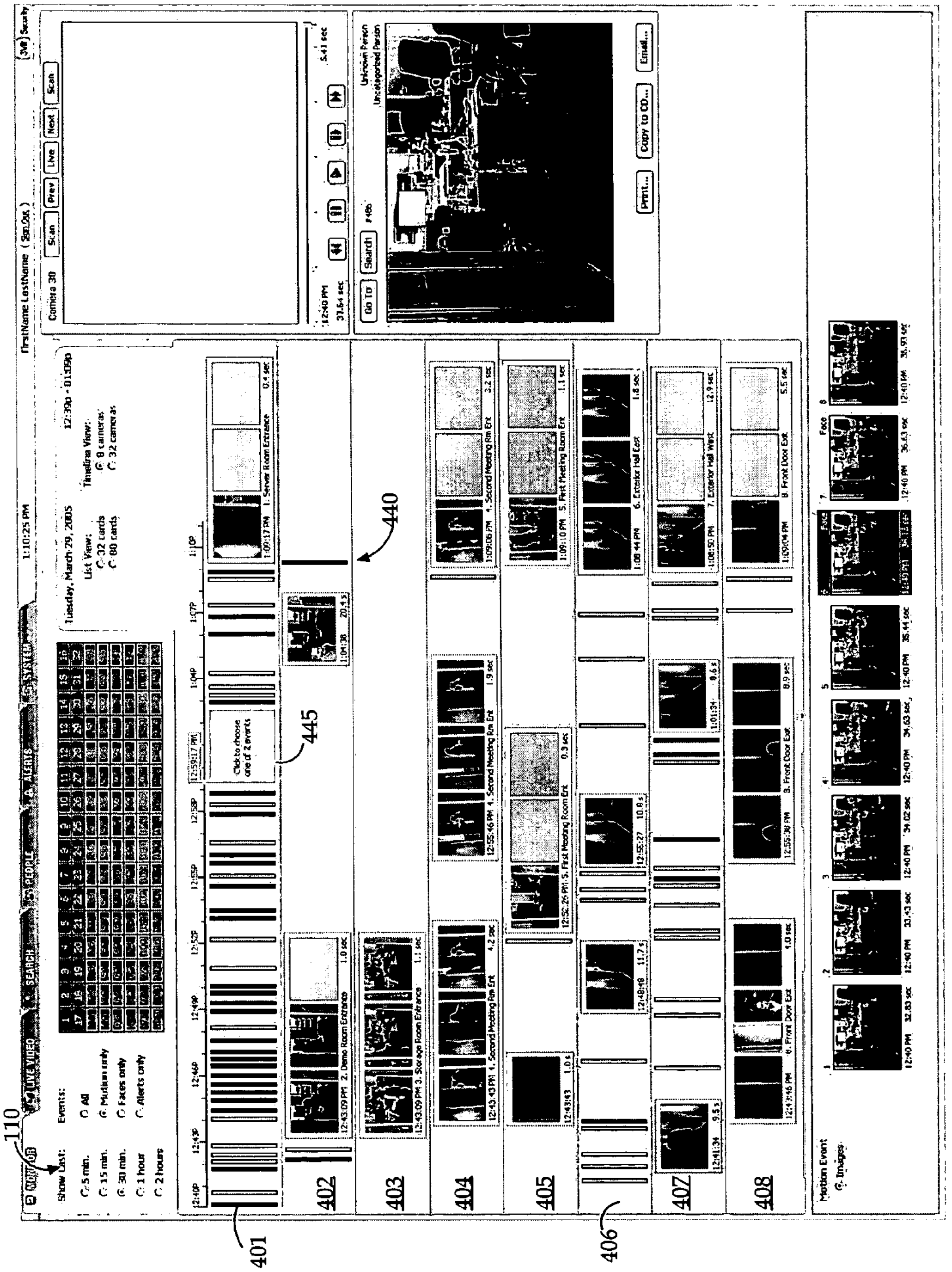
FIG. 5 is an example screen from an embodiment that illustrates two types of dynamic event card representations of video stream data captured by a multi-camera video surveillance system.
Figure 6:
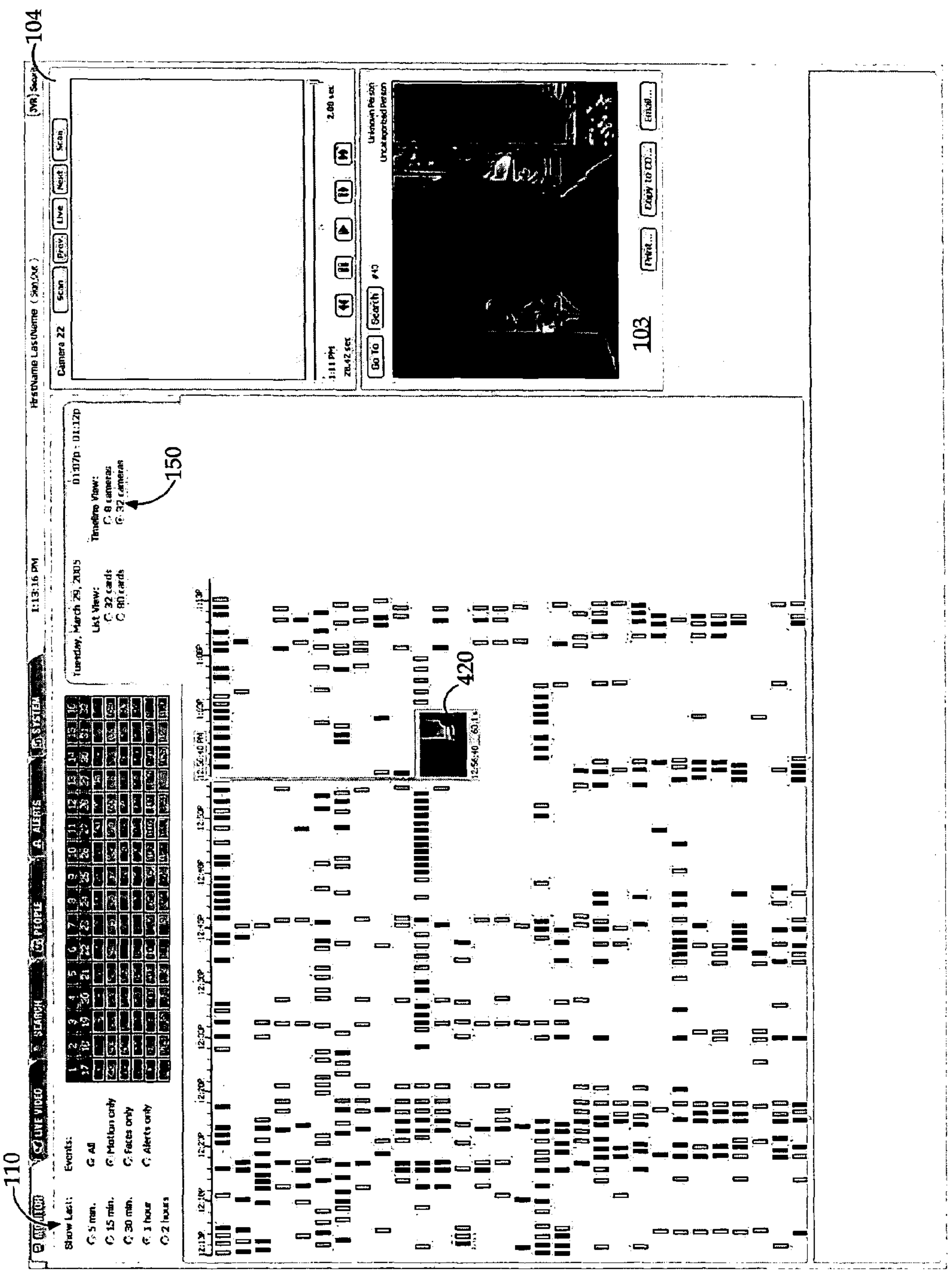
FIG. 6 is an example screen from an embodiment that illustrates another embodiment of two types of compressed event card representations of video stream data captured by a multi-camera video surveillance system.

FIGS. 4-6 illustrate example timeline view embodiments. As shown in timeline selection panel 150 in FIG. 4, the user has selected to view event timelines for eight cameras. The eight event timelines are shown as timelines 401-408. In the timeline view, event video clips may be represented in various ways. As a timeline view displays all representations of event video clips in a single screen, a dynamic "compressed event card" may be used to represent an event video clip. In one embodiment, a compressed event card is a grey or black bar that dynamically expands to show a paneled event card when a user selects or rolls his cursor over the compressed event card. Preferably, when a compressed event card is selected or highlighted, a paneled event card that represents the event video clip is displayed until the user moves the cursor to a different location on the screen.

In one embodiment, how an event is represented depends on the density of events. For example, a camera that has low event density displays the events as three-panel event cards. A camera that has a high density of events may represent at least some of the events with compressed event cards.

Preferably, the system automatically displays event video clips with the type of event card that displays the most information without overlapping another event card. For example, if there is insufficient space on a timeline to display a three-panel event card without overlapping another event card on the timeline, then a one-panel event card is used. If there is insufficient space to display the one-panel event card without overlapping another event card, then a compressed event bar is used to represent an event video clip.

For example, as shown in FIG. 4, timeline 401 represents events that have occurred in the last 5 minutes for camera 1. (As shown in time period selection panel 110, 5 minutes is currently selected.) The relevant time period is graphically shown as timeline header 430.

In the embodiment shown in FIG. 4, the most recent event is always displayed as a three-panel event card, as shown by event card 411. Preferably, the timelines are configured such that the most recent events can always be shown as three-panel cards. This is done so that the maximum amount of information possible is displayed for the representations of the most recent events. When an event of interest occurs, it is easy to slide the cursor backwards in time along the timeline to obtain more information about earlier events that may be related to the most recent event.

The event video clip represented by compressed event card 412 occurred just before the event video clip represented by three-panel event card 411. If instead a three-panel event card were used to represent the event video clip that is represented by compressed event card 412, then this event card would overlap event card 411. In this example, a one-panel event card would also overlap event card 411. Therefore, a compressed event card 412 is used to represent the event video clip. In the embodiment shown in FIG. 4, a compressed event card that represents a single event is shown as a grey bar.

One-panel event card 413 represents the event video clip that occurred just prior to the event video clip represented by the grey bar compressed event card 412. In this case, while there is not enough room to represent the event video clip using a three-panel event card without overlapping grey bar compressed event card 412, a one-panel event card can be used without overlapping event card 412.

When an event video clip is represented by a grey bar compressed event card, rolling the cursor over or otherwise selecting or highlighting the grey bar will cause the bar to dynamically expand to an event card that temporarily overlaps the next event card. An example of this is shown in FIG. 6, when event bar 420 is highlighted (e.g., the cursor rolls over the bar card) and the associated one-panel event card is shown. Alternatively, a three-panel event card may be shown when a grey bar compressed event card is selected, or the system may make a determination as to which event card to show when the bar is selected.

In one embodiment, rolling over a compressed event card may also cause the event card to be selected, and therefore cause the represented event video clip to play in panel 104, and selected frames from the event video clip to be shown in frame panel 102. Alternatively, the event card that is displayed when the compressed event card is under the cursor must be selected in a separate step in order to cause the event video clip to be selected and played.

The embodiment shown in FIG. 4 illustrates a 5-minute timeline. When longer timelines are displayed, the "density" of the event cards to display in the timeline view increases. This is illustrated in FIG. 5, where a time period of 30 minutes is selected in time period selection panel 110.

As shown in FIG. 5, the most current events are represented by three-panel event cards. If a camera's event density is low, such as cameras 5 or 8 represented by timelines 405 and 408 respectively, then most of the event video clips can be represented as three-panel event cards or one-panel event cards.

FIG. 5 illustrates an additional type of compressed event card. As shown by timelines 401, 402 and 407, when event density is heavier, then it is sometimes possible that even compressed event cards that represent a single event video clip will overlap. In this case, a second type of compressed event card may be used to represent multiple single compressed event cards, as illustrated by black bar event card 440. In this embodiment, grey bars are used as compressed event cards representing a single event video clip, and black bars are used as compressed event cards representing multiple event video clips. Other types of representations for multiple events are of course possible. For example, a black bar could be divided into multiple segments, wherein each segment represents a single event.

When a black bar is used to represent multiple events, rolling the cursor over the black bar will cause a menu, or other means for presenting selections for a user to choose from, to pop up. This is illustrated in FIG. 5 as menu 445. In this example, a user has rolled the cursor over, or otherwise highlighted, the black bar compressed event card. After clicking on menu 445, the user is then given a choice of which event represented by the black bar compressed event card that he wishes to select. The events represented by the black bar can be labeled by time, event type and/or object identification, or any other means. In one embodiment, the pop-up menu consists of a list of one-panel event cards, and the user selects the one-panel event card of interest.

Event representations change dynamically in the timeline view. When a new event occurs, it will automatically be represented by a three-panel event card in one embodiment. When the next event occurs, this three-panel event card may be reduced to a one-panel event card or a compressed event card depending on how soon the next event occurs.

Figure 13:
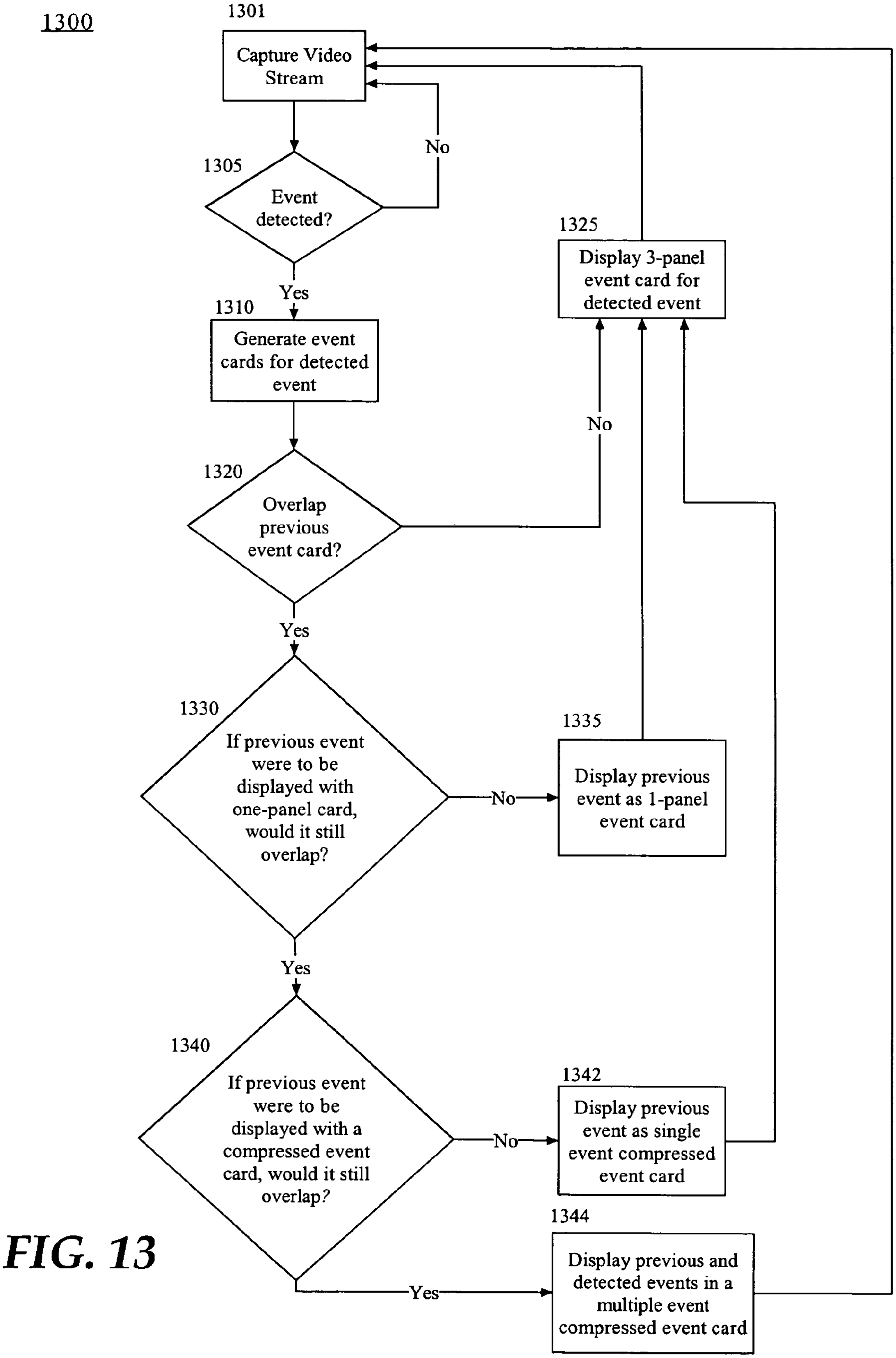
FIG. 13 is a flowchart illustrating one embodiment of a method for dynamically changing the representation of an event video clip.

FIG. 13 illustrates one embodiment of a method 1300 for dynamically changing the representation of event video clips as events are detected. In one embodiment, method 1300 is used to manage the video stream from a single camera.

At step 1301, the camera captures video data until an event is detected. When an event is detected in the video stream, or detected by external means and associated with the video stream, at step 1305, event card(s) for the event video clip are generated at step 1310. Using the example embodiment discussed above, a three-panel event card and one-panel event card may both be generated. In addition, additional frames may be selected from the event video clip and saved with the event card.

At step 1320, it is determined whether a new three-panel event card would overlap the event card of the previous event in the currently displayed timeline. If it does not overlap, then no adjustments need to be made and the process continues to 1325 where the newly detected event is displayed as a three-panel event card.

However, if a new three-panel event card does overlap the event card of the previous event, then the previous event card needs to be compressed. At step 1330, it is determined whether the three-panel event card representing the new event would overlap a one-panel event card representing the previous event. In one embodiment, step 1330 is only executed if the previous event is currently represented by a three-panel event card.

If a new three-panel event card of the detected event would not overlap a one-panel event card of the previous event, then the previous event is displayed as a one-panel event card (step 1335) and the process proceeds to 1325. Step 1325 and 1335 may be performed in any order or concurrently.

If a new three-panel event card of the detected event would overlap a one-panel event card, then the process proceeds to step 1340. At 1340, it is determined whether a new three-panel event card representing the detected event would overlap a compressed card representing the previous event. If not, then the previous event is represented as a single event compressed event card (step 1342), where a grey bar may be displayed for the previous event and the process continues to step 1325.

If so (i.e. a three-panel event card would overlap a single event compressed event card), then the previous event must be represented with the detected event in a multiple event compressed event card (step 1344), where a black bar may be displayed for the multiple event compressed event card.

Process 1300 continues as long as video data from the camera is being represented in the timeline view.

Dynamically choosing the most appropriate event card to represent an event video clip based on event density allows great variety in the timeline view. Because some cameras have a great deal more activity than others, dynamic event card determination allows the most information possible to be displayed for each camera. Different event densities can be displayed in the same timeline, and event representations are dynamically adjusted according to event density.

Timelines can be shown for a great number of cameras and for long periods of time, using the grey and black bar compressed event cards. FIG. 6 illustrates an example in which 32 cameras are chosen in timeline view selection panel 150, and 1 hour is selected as the time period in time period selection panel 110. As shown in FIG. 6, many event video clips are represented in a single page. By moving the cursor around, the user can scan events by highlighting various compressed event cards. For example, in FIG. 6, the user has highlighted a grey bar compressed event card to cause one-panel event card 420 to automatically be displayed for the event video clip represented by the grey bar. Just as in the list view, selecting an event card causes the associated event video clip to be played in panel 103, and selected frames associated with the event card to be displayed in a panel (such as panel 102 of FIG. 1).

In one embodiment, a 32 camera view timeline always represents events as grey and black bar compressed event cards. The 32-camera (or other large number of cameras) view allows a user to see exactly when and where events took place for a large number of cameras over long periods of time. Even though the timeline view will have many compressed event cards, a review of the actual video surveillance data from 32 cameras over an hour time period would take much longer than scanning through dynamic compressed event cards to find event video clips of interest.

Described above is an embodiment in which four levels of event densities can be represented by various event cards—three-panel event cards, one-panel event cards, grey bar compressed event cards, and black bar compressed event cards. More or fewer levels could be configured using additional types of bars as event cards, or other types of event cards to represent single or multiple events.

Camera Selection

In a surveillance system that uses a large number of cameras, it can be quite difficult for a user to determine and select the appropriate cameras to monitor. For instance, a surveillance system may be set up to monitor a campus of buildings. Each building may have a large number of floors and entrances. Having a camera stationed at each entrance throughout the campus may result in hundreds or thousands of cameras.

Typically, cameras are set up in a hierarchical manner. Using the above example, a camera may be named or identified according to Building/Floor/Corridor, for instance.

In one scenario, a user only wants to monitor one particular area at a time. In order to monitor a particular area, the user must know which cameras cover that area. In one embodiment, cameras are labeled according to specific location in order to help the user identify the camera. For example, camera 54 may be labeled "Building B, Second Floor, Elevator lobby." The user can use the description to select the particular camera. However, if the user wants to monitor all Building B cameras, it is difficult to individually select each camera in Building B.

In one embodiment, cameras, or groups of cameras, can be selected through camera selection grid 130. Each camera occupies a separate grid entry. When a user selects, or rolls the cursor over, a particular grid entry, information about that camera, such as name, type of camera, etc., can be displayed. This is illustrated for Camera 20 in FIG. 7 with label "Kitchen entrance" that dynamically pops up below the 20 grid when the cursor rolls over the 20 grid.

In addition to displaying individual camera information, in one embodiment, the user can access or edit camera group information. In the embodiment shown in FIG. 7, cameras 1-32 have previously been selected. When the user rolls the cursor over camera 20, he is presented with options (135) to 1) select only camera 20 (i.e., de-select cameras 1-19 and 21-32), 2) remove camera 20 from the selected group of cameras, 3) de-select a subgroup associated with camera 20 from the currently selected group of cameras (in FIG. 7, this is illustrated as "Clear 17-24", which is a subgroup associated with camera 20), or 4) de-select all currently selected cameras. Likewise, when a camera that is not currently selected, such as camera 66, is highlighted, the user may be presented with a choice to add the camera to the selected group of cameras, add a subgroup associated with camera 66 to the selected group of cameras, etc.

The camera grid display provides an easy method for a user to view and utilize camera hierarchical information in camera selection.

Annotated Events

In one embodiment, event cards can be annotated and/or categorized by users. For example, when an event card is selected, there may be a button or other type of option that allows the user to enter a note that will then be associated with the event card. An example of an interface to allow a user to annotate event cards with notes is shown in FIGS. 8-9.

Figure 7:
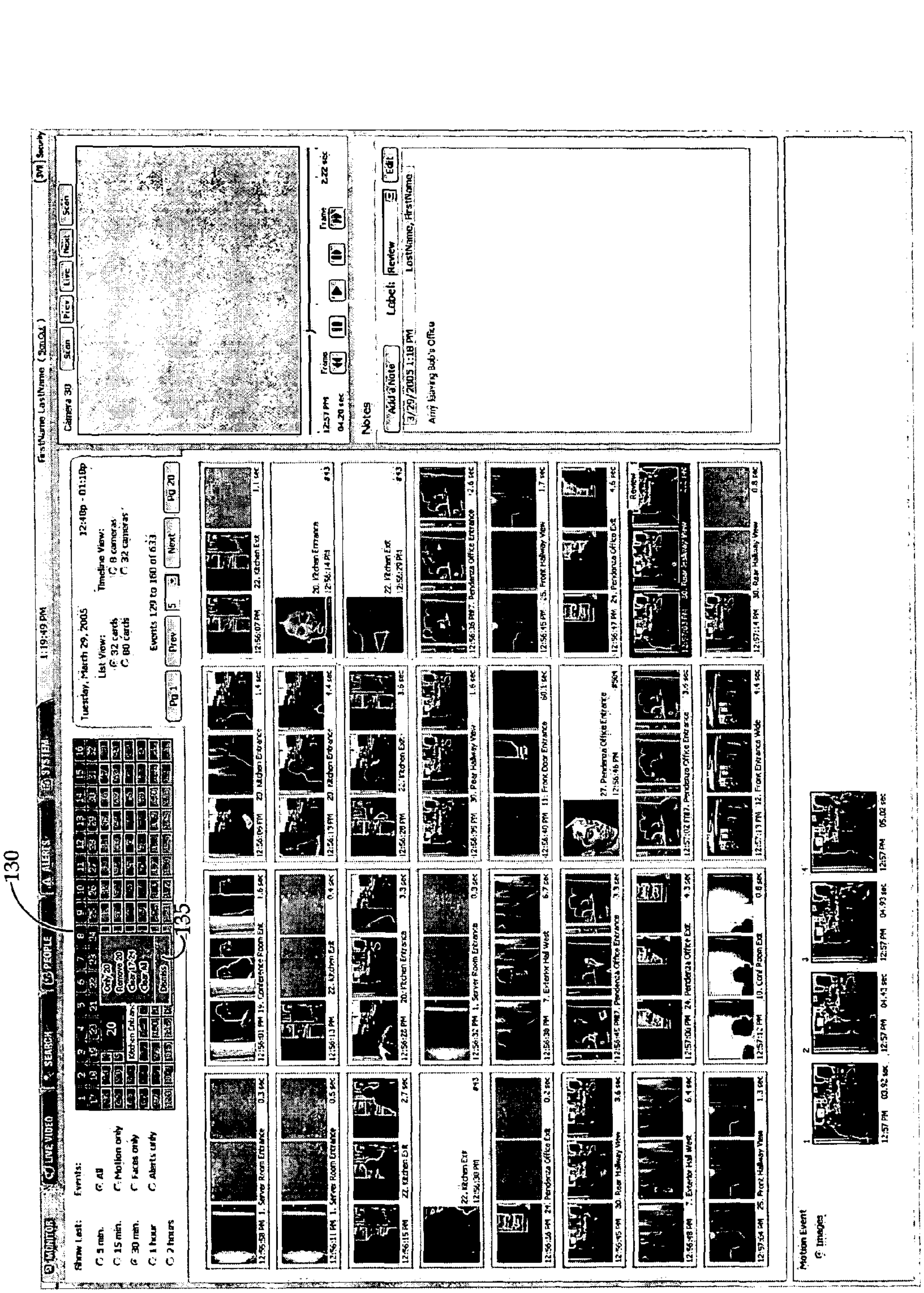
FIG. 7 is an example screen from an embodiment that illustrates a camera selection grid.
Figure 8:
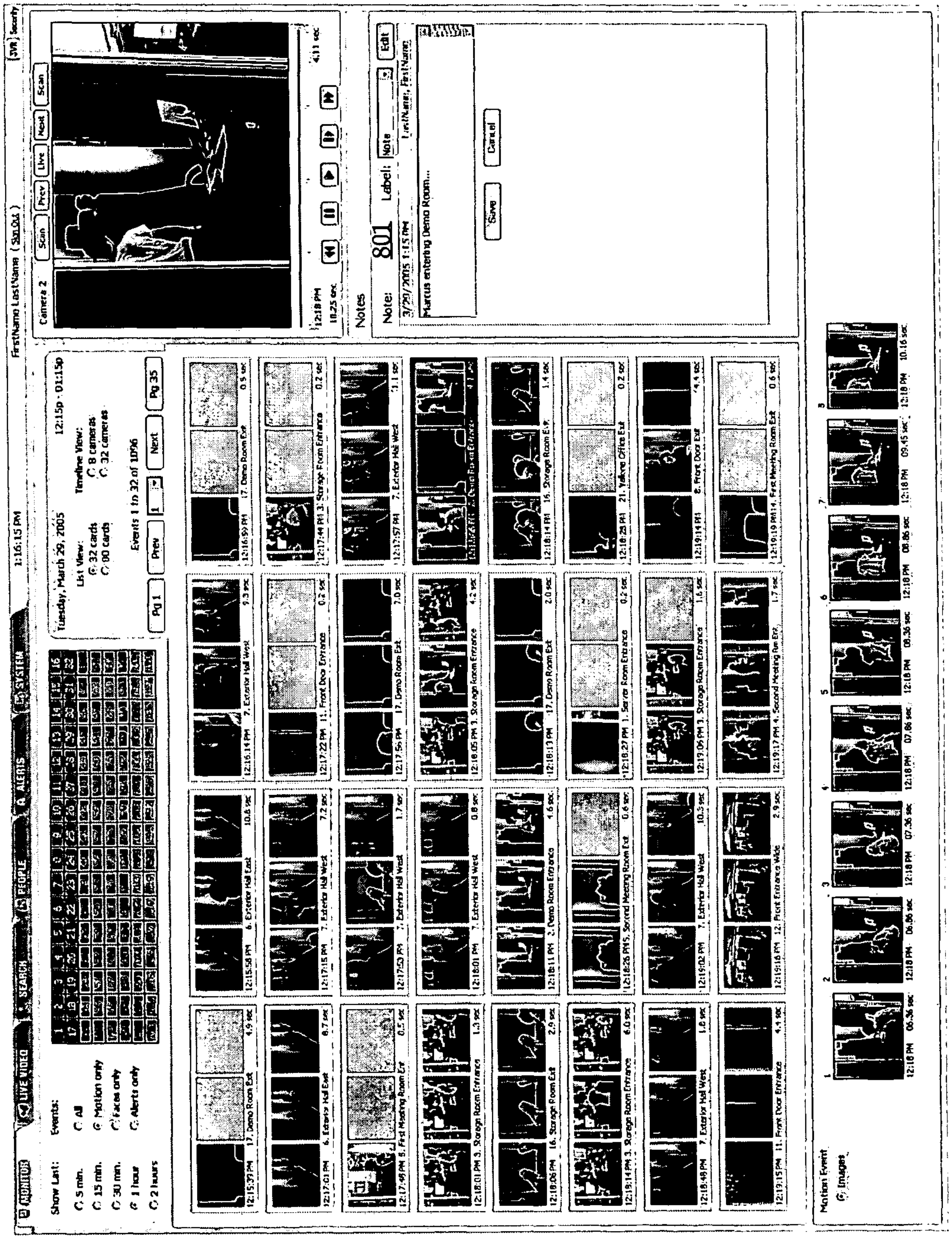
FIG. 8 is an example screen from an embodiment that illustrates an annotation entry dialog.
Figure 9:
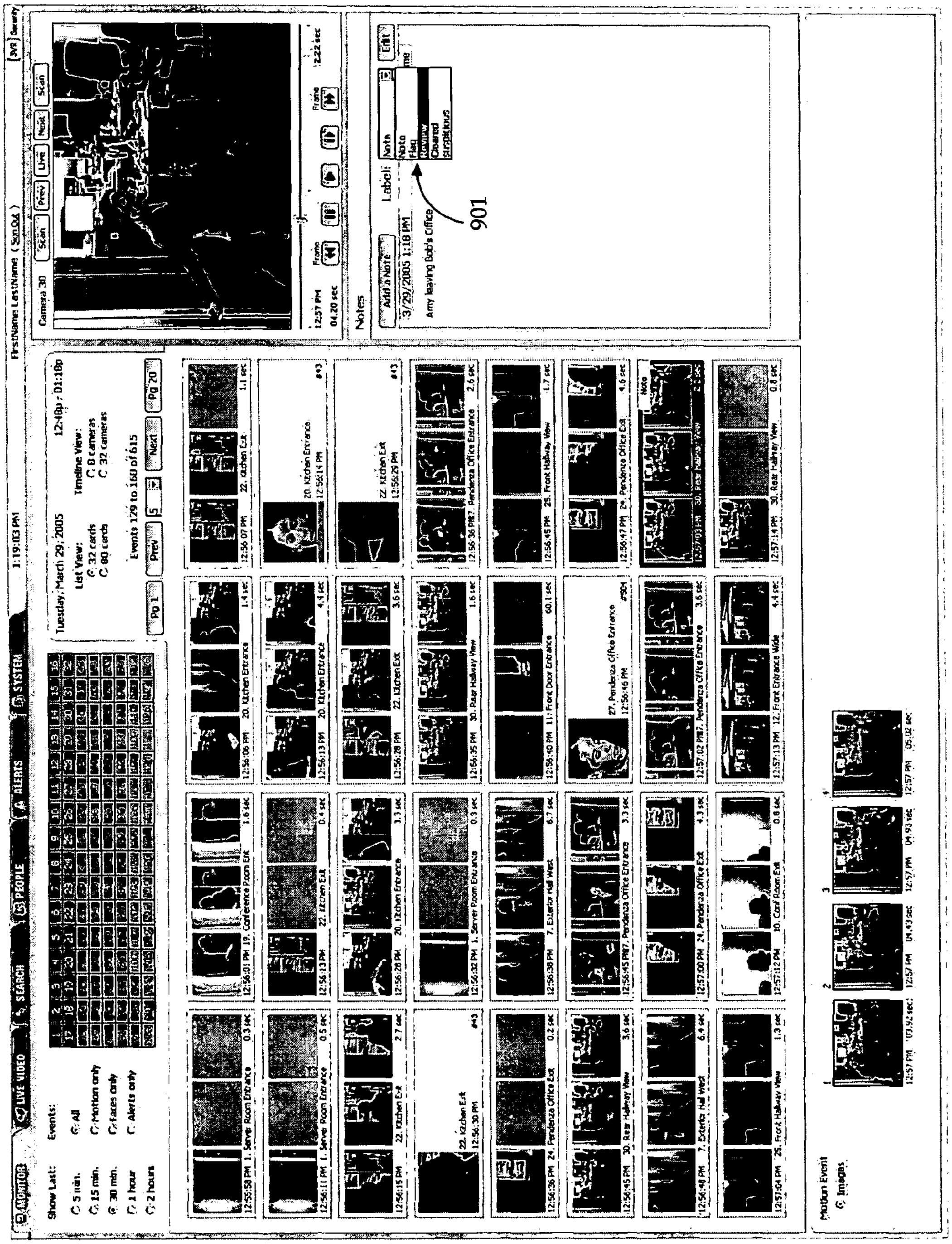
FIG. 9 is an example screen from an embodiment that illustrates an annotation label dialog.

As shown in FIGS. 7 and 9, a user may be presented with an "Add a Note" button. When this button is clicked by a user, an interface such as interface 801 in FIG. 8 may be displayed. As shown, the user can type in a note, and press "Save" to save the note and associate it with the event card.

As shown in FIGS. 8 and 9, the note can also be categorized. FIG. 9 illustrates a user selecting to categorize the note as a "Review" note from a pulldown menu 901. Different categories can be configured than those shown in FIG. 9. In one embodiment, the categorizations are extendable by users. That is, a user can add different categorizations to the list of available categories. This allows flags to be added on the fly so that users can annotate event cards in an efficient and organized manner.

Once a note has been entered, a user can later edit it, change its categorization or add a new note. These choices are shown in FIG. 7, after the first note has been entered. Different users can enter different notes for the same event card, edit notes entered by previous users, or delete notes. For example, a note may be categorized as "Review." Once an expert user has reviewed the event and the note, the expert user can delete this note as the review has taken place. In one embodiment, users may have different notes permissions, such that only certain users can add a note or categorize a note.

Once notes have been associated with event cards, they can be searched. For example, a user can search for all event cards with a "Review" note.

Searching for Events

Figure 10:
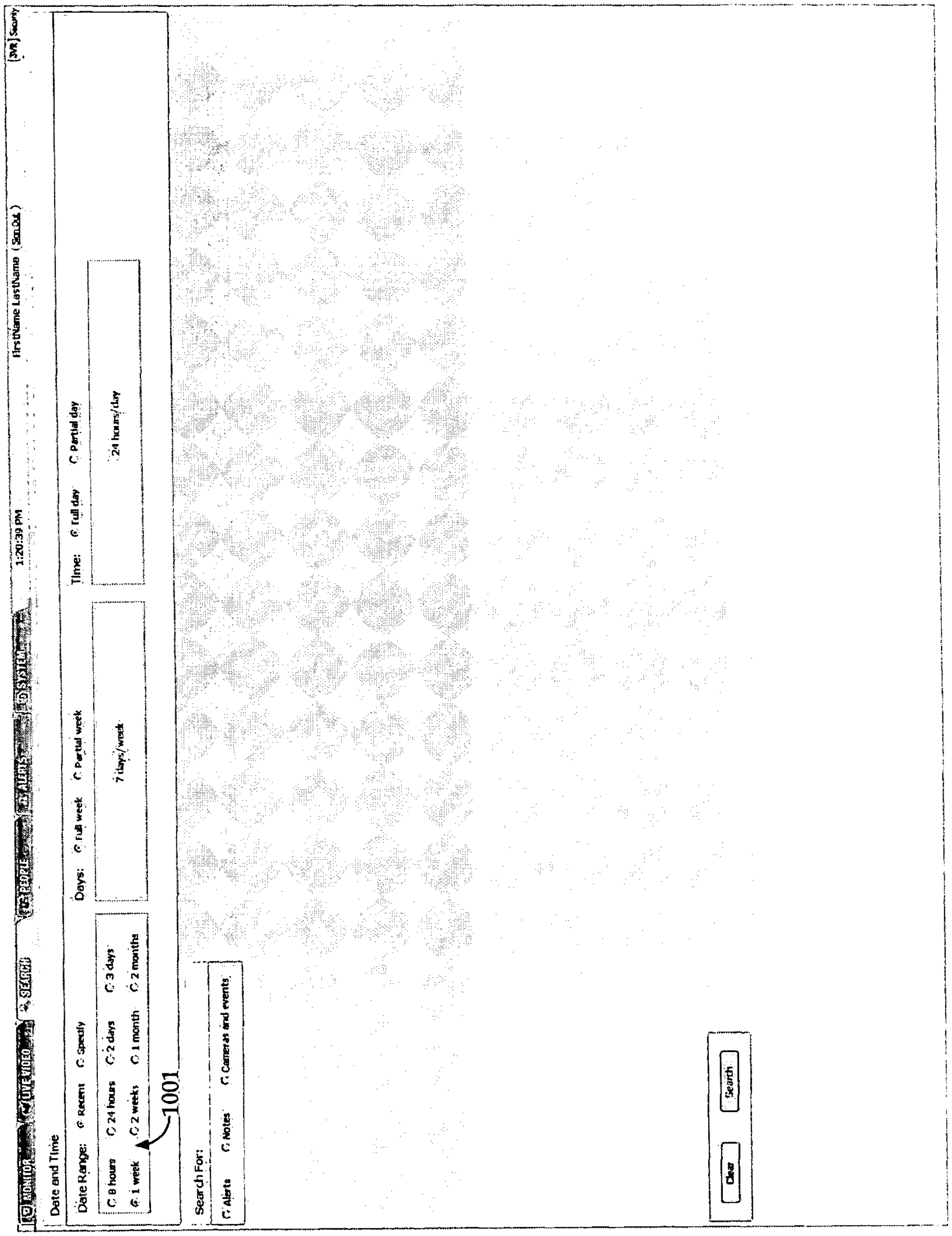
FIG. 10 is an example screen from an embodiment that illustrates a date range entry search dialog.
Figure 11:
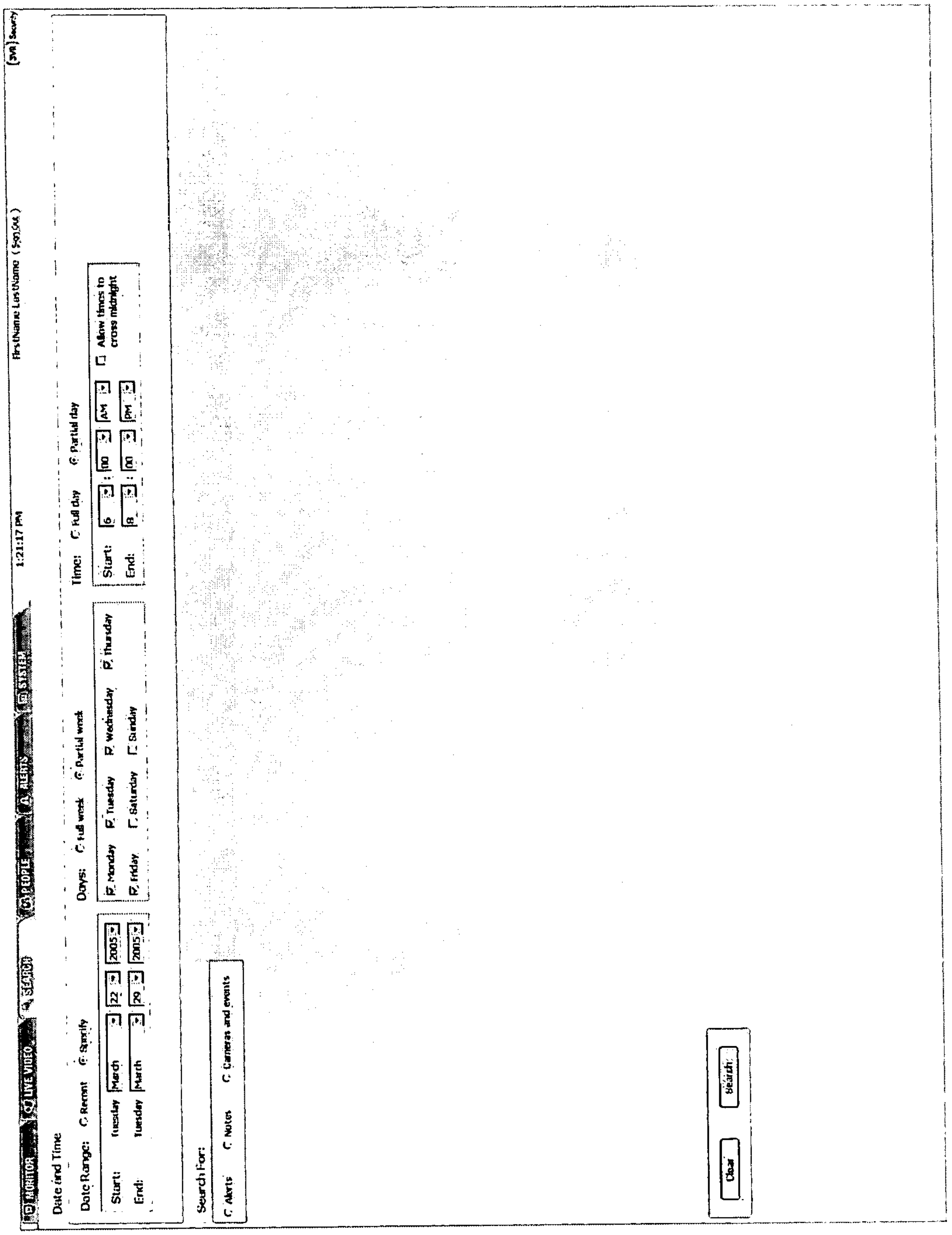
FIG. 11 is an example screen from an embodiment that illustrates another embodiment of a date range search dialog.

In one embodiment, events can be searched in a number of ways. FIGS. 10 and 11 illustrate embodiments of a search interface that could be used when the "Search" tab of the monitor panel is selected.

One option is to query for events that occurred in a particular timeframe. Most query interfaces allow a user to select a month, a day, a year and/or a time period within a day selected by beginning and end times to query based on time. This is illustrated in FIG. 11, in which a user can select which dates, days or clock times to search for events. Significantly, for these searches, start and end times must be defined for the query. In one embodiment, the specified date range options and partial day times are displayed to a user with radio buttons. For example, a radio button for a partial day time may indicate the hours between 6:00 AM and 8:00 PM and another radio button for the partial day time may indicate the hours between 8:00 PM and 6:00 AM. The timeframes may or may not overlap in time.

In one embodiment, queries using techniques disclosed herein allow a user to make time-based queries without defining exact beginning and ending times. This is illustrated in FIG. 10. In this alternative query representation, a user can select a query for a particular time period without selecting beginning and end times. For example, if the user wants to query for the last 8 hours, they can just select 8 hours in a selection panel 1001. The system will automatically determine the current time, determine the time from 8 hours ago, and construct the query from these determinations. The user does not have to enter the start time and end time—the system dynamically determines this information.

A user can perform this common query with a single click, instead of having to construct all aspects of the query.

Hardware Overview

Figure 12:
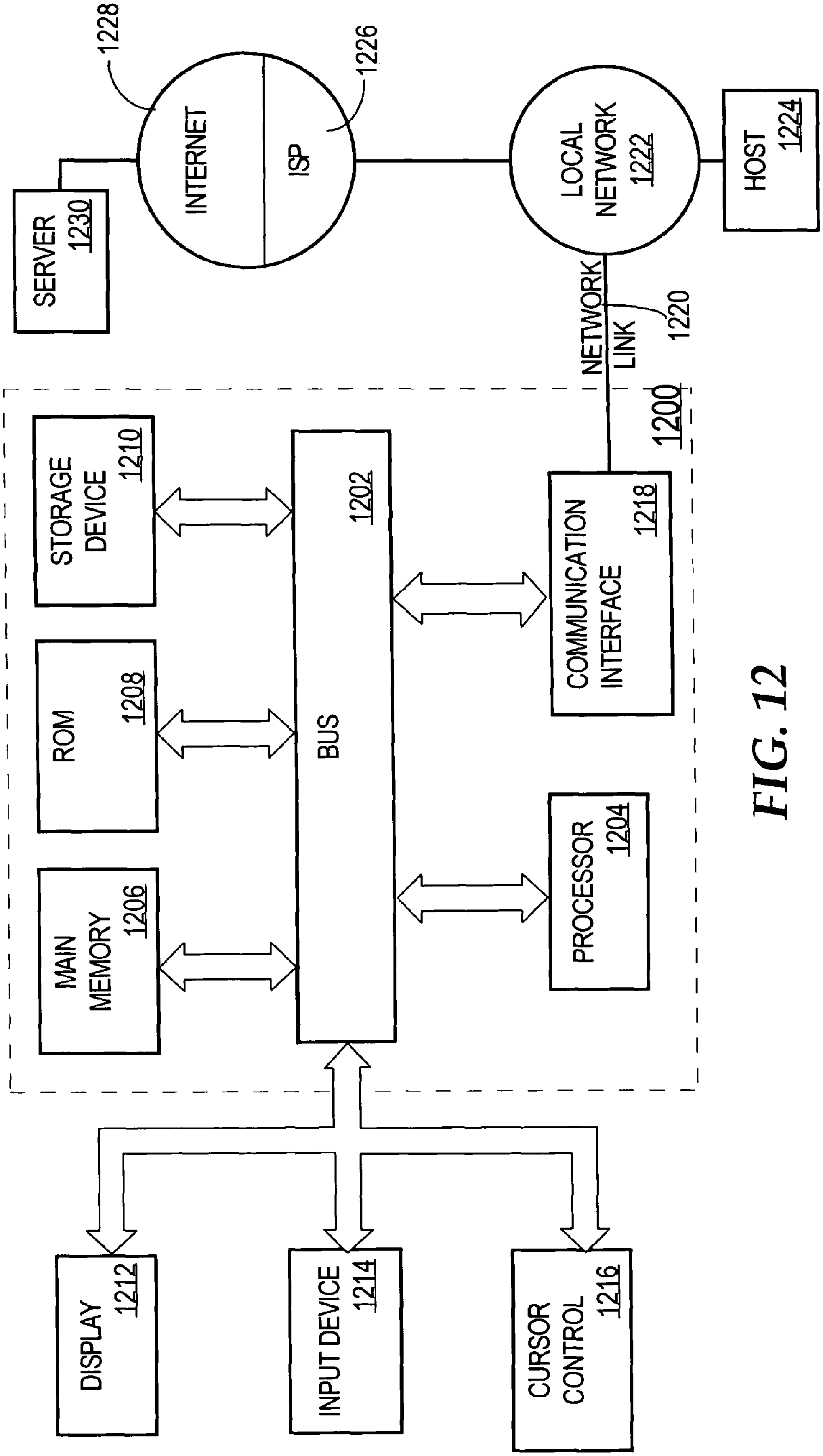
FIG. 12 is a block diagram that illustrates a computer system upon which an embodiment of the invention may be implemented.

FIG. 12 is a block diagram that illustrates a computer system 1200 upon which an embodiment of the invention may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The invention is related to the use of computer system 1200 for implementing the techniques described herein. According to one embodiment of the invention, those techniques are performed by computer system 1200 in response to processor 1204 executing one or more sequences of one or more instructions contained in main memory 1206. Such instructions may be read into main memory 1206 from another machine-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1200, various machine-readable media are involved, for example, in providing instructions to processor 1204 for execution. Such a medium may take many forms, including but not limited to, non-volatile media, volatile media, and transmission media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are exemplary forms of carrier waves transporting the information.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution. In this manner, computer system 1200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method of displaying video surveillance system information comprising the steps of:

capturing a video stream from a camera of the video surveillance system;

detecting an event;

in response to detecting the event, selecting, from the video stream, an event video clip that is associated with the event and no other event;

without receiving any user input to indicate the frames to be selected, selecting a first frame from a first portion of the event video clip, selecting a second frame from a second portion of the event video clip;

in response to selecting the first and second frames, storing the first and second frames in an event card that is associated with the event;

wherein the event card is a visual indicator that represents the event video clip that corresponds to the occurrence of the event;

wherein the first portion is different from the second portion; and causing the event card to be displayed;

wherein the method is performed by one or more computing devices.

2. The method of claim 1, further comprising:

receiving user input associated with the event card; and in response to the user input, playing the event video clip.

3. The method of claim 1, wherein the first portion of the event video clip is a beginning portion, and the second portion of the event video clip is an ending portion.

4. The method of claim 1, further comprising selecting a third frame from a third portion of the event video clip and storing the third frame in the event card, wherein the third portion is different from the first portion and the second portion.

5. The method of claim 1, further comprising generating a plurality of event cards for the event, wherein generating the plurality of event cards comprises storing a first particular frame in a first event card of the plurality of event cards and a second particular frame in a second event card of the plurality of event cards, wherein the first particular frame is different from the second particular frame.

6. The method of claim 1, further comprising storing a third frame associated with the event separately from the event card, wherein the first and second frames are different than the third frame.

7. The method of claim 6, further comprising, in response to selecting the event card, causing the third frame to be displayed.

8. The method of claim 1, wherein selecting the first frame comprises selecting at least one frame, from the event video clip, that satisfies one or more criteria, wherein the first frame depicts a motion relative to other frames from the event video clip, wherein characteristics of the motion satisfy said one or more criteria.

9. The method of claim 1, wherein selecting the first frame comprises:

selecting at least one frame from the event video clip that contains an image of a face;

determining a best view of the face in the selected at least one frame; and storing the determined best view of the selected at least one frame in the event card.

10. The method of claim 1, further comprising storing metadata about the event in association with the event card, wherein causing the event card to be displayed additionally comprises causing the stored metadata to be displayed.

11. The method of claim 1, wherein detecting an event comprises receiving event notification from an external source.

12. The method of claim 1, wherein detecting an event comprises detecting motion in the video stream.

13. The method of claim 1, wherein detecting an event comprises detecting a face in the video stream.

14. The method of claim 1, further comprising receiving an annotation and storing the annotation in association with the event card.

15. The method of claim 1, further comprising providing one or more controls for sorting a plurality of event cards that correspond to a plurality of events based on at least one of the following criteria: a selection of one or more cameras from a set of one or more cameras that captured the plurality of events, a specified time period, or the type of each event in the plurality of events, wherein the type includes at least one of the following types: motion event, face event, and alert event.

16. The method of claim 1, further comprising providing one or more controls for searching across a plurality of events based on at least one of the following criteria: a selection of one or more cameras from a plurality of cameras that captured the plurality of events, a specified time period, or the type of said each event, wherein the type includes at least one of the following types: motion event, face event, and alert event.

17. The method of claim 1, further comprising providing one or more controls for scanning through a plurality of events, wherein the plurality of events were captured from a particular camera or a plurality of cameras.

18. The method of claim 17, wherein the one or more controls comprise at least one of the following: a first button for causing an event that precedes in time a currently selected event from the plurality of events to be displayed or a second button for causing an event that follows in time the currently selected event to be displayed.

19. A method of displaying event card representations of events in a surveillance system, comprising the steps of:

detecting a first event;

representing the first event in a timeline with a first event card;

wherein the first event card is a visual indicator that represents a first event video clip that corresponds to the occurrence of the first event;

detecting a second event after the first event;

representing the second event in the timeline with a second event card;

wherein the second event card is a visual indicator that represents a second event video clip that corresponds to the occurrence of the second event;

determining whether the second event card would overlap the first event card in a display; and in response to determining that the second event card would overlap the first event card in the display, representing the first event in the timeline with a first compressed event card instead of the first event card;

wherein the method is performed by one or more computing devices.

20. The method of claim 19, wherein a selection of the first compressed event card causes the first compressed event card to expand to the first event card, temporarily overlapping the second event card.

21. The method of claim 20, wherein the selection of the expanded first event card causes at least one of the following: displaying a segment of video associated with the first event and displaying metadata associated with the first event.

22. The method of claim 19, wherein first event card comprises an event card containing at least one frame from an event video clip associated with the first detected event.

23. The method of claim 19, further comprising:

detecting a third event after the second event;

representing the third event in the timeline with a third event card; and if the third event card would overlap the first and second event cards, then representing the first and second events in the timeline with a second compressed event card.

24. The method of claim 23, wherein the second compressed event card indicates the number of events that are represented by the second compressed event card.

25. The method of claim 23, wherein a selection of the second compressed event card causes a representation of the first event or a representation of the second event to be displayed.

26. The method of claim 25, wherein a selection of the representation of the first event causes the representation of the first event to expand temporarily to the first event card.

27. The method of claim 26, wherein a selection of the expanded first event card causes at least one of the following: displaying a segment of video associated with the first event and displaying metadata associated with the first event.

28. A method of displaying event card representations of events in a video surveillance system, comprising the steps of:

detecting a first event;

generating a first set of event cards for the first event, wherein the first set of event cards includes a multi-panel event card and a single-panel event card;

wherein each event card of the first set is a visual indicator that represents a first event video clip that corresponds to the occurrence of the first event;

representing the first event, in a timeline, using the multi-panel event card of the first set of event cards;

detecting a second event after the first event;

determining whether an event card of the second event would overlap the multi-panel event card of the first set;

if the event card of the second set would overlap the multi-panel event card of the first set, then dynamically changing how the first event is represented in the timeline by ceasing to represent the first event with the multi-panel event card and representing the first event with the single-panel event card of the first set of event cards;

wherein the method is performed by one or more computing devices.

29. The method of claim 28, wherein generating a first set of event cards for the first event comprises:

selecting at least one frame from a first event video clip associated with the first event; and generating at least one event card that comprises the at least one selected frame.

30. The method of claim 28, wherein:

the event card of the second event is a multi-panel event card of a second set of event cards; and the method further comprising if the multi-panel event card of the second set would overlap the single-panel event card of the first set, then dynamically representing the first event in the timeline with a compressed event card associated with the first set of event cards.

31. The method of claim 30, further comprising:

receiving an indication that the compressed event card has been selected; and dynamically expanding the compressed event card to display an event card in the first set of event cards to at least temporarily overlap the multi-panel event card of the second set of event cards.

32. The method of claim 30, further comprising:

if the multi-panel event card of the second set would overlap the compressed event card of the first set, then dynamically representing the first event and the second event in the timeline with a single multiple-event compressed event card.

33. The method of claim 32, further comprising:

receiving an indication that the multiple-event compressed event card has been selected; and dynamically expanding the multiple-event compressed event card to display an interface for selecting either the first event or the second event.

34. One or more non-transitory machine-readable media storing instructions which, when executed by one or more processors, cause the performance of the method recited in claim 2.

35. One or more non-transitory machine-readable media storing instructions which, when executed by one or more processors, cause the performance of the method recited in claim 1.

36. One or more non-transitory machine-readable media storing instructions which, when executed by one or more processors, cause the performance of the method recited in claim 3.

37. One or more non-transitory machine-readable media storing instructions which, when executed by one or more processors, cause the performance of the method recited in claim 4.

38. One or more non-transitory machine-readable media storing instructions which, when executed by one or more processors, cause the performance of the method recited in claim 5.

39. One or more non-transitory machine-readable media storing instructions which, when executed by one or more processors, cause the performance of the method recited in claim 6.

40. One or more non-transitory machine-readable media storing instructions which, when executed by one or more processors, cause the performance of the method recited in claim 7.

41. One or more non-transitory machine-readable media storing instructions which, when executed by one or more processors, cause the performance of the method recited in claim 8.

42. One or more non-transitory machine-readable media storing instructions which, when executed by one or more processors, cause the performance of the method recited in claim 9.

43. One or more non-transitory machine-readable media storing instructions which, when executed by one or more processors, cause the performance of the method recited in claim 10.

44. One or more non-transitory machine-readable media storing instructions which, when executed by one or more processors, cause the performance of the method recited in claim 11.

45. One or more non-transitory machine-readable media storing instructions which, when executed by one or more processors, cause the performance of the method recited in claim 12.

46. One or more non-transitory machine-readable media storing instructions which, when executed by one or more processors, cause the performance of the method recited in claim 13.

47. One or more non-transitory machine-readable media storing instructions which, when executed by one or more processors, cause the performance of the method recited in claim 14.

48. One or more non-transitory machine-readable media storing instructions which, when executed by one or more processors, cause the performance of the method recited in claim 15.

49. One or more non-transitory machine-readable media storing instructions which, when executed by one or more processors, cause the performance of the method recited in claim 16.

50. One or more non-transitory machine-readable media storing instructions which, when executed by one or more processors, cause the performance of the method recited in claim 17.

51. One or more non-transitory machine-readable media storing instructions which, when executed by one or more processors, cause the performance of the method recited in claim 18.

52. One or more non-transitory machine-readable media storing instructions which, when executed by one or more processors, cause the performance of the method recited in claim 19.

53. One or more non-transitory machine-readable media storing instructions which, when executed by one or more processors, cause the performance of the method recited in claim 20.

54. One or more non-transitory machine-readable media storing instructions which, when executed by one or more processors, cause the performance of the method recited in claim 21.

55. One or more non-transitory machine-readable media storing instructions which, when executed by one or more processors, cause the performance of the method recited in claim 22.

56. One or more non-transitory machine-readable media storing instructions which, when executed by one or more processors, cause the performance of the method recited in claim 23.

57. One or more non-transitory machine-readable media storing instructions which, when executed by one or more processors, cause the performance of the method recited in claim 24.

58. One or more non-transitory machine-readable media storing instructions which, when executed by one or more processors, cause the performance of the method recited in claim 25.

59. One or more non-transitory machine-readable media storing instructions which, when executed by one or more processors, cause the performance of the method recited in claim 26.

60. One or more non-transitory machine-readable media storing instructions which, when executed by one or more processors, cause the performance of the method recited in claim 27.

61. One or more non-transitory machine-readable media storing instructions which, when executed by one or more processors, cause the performance of the method recited in claim 28.

62. One or more non-transitory machine-readable media storing instructions which, when executed by one or more processors, cause the performance of the method recited in claim 29.

63. One or more non-transitory machine-readable media storing instructions which, when executed by one or more processors, cause the performance of the method recited in claim 30.

64. One or more non-transitory machine-readable media storing instructions which, when executed by one or more processors, cause the performance of the method recited in claim 31.

65. One or more non-transitory machine-readable media storing instructions which, when executed by one or more processors, cause the performance of the method recited in claim 32.

66. One or more non-transitory machine-readable media storing instructions which, when executed by one or more processors, cause the performance of the method recited in claim 33.

* * * * *